United States Patent
Lindheimer et al.

(10) Patent No.: US 12,255,977 B2
(45) Date of Patent: *Mar. 18, 2025

(54) METHODS AND APPARATUS FOR TRANSMITTING CAPABILITY INFORMATION

(71) Applicant: Telefonaktiebolaget LM Ericsson (publ), Stockholm (SE)

(72) Inventors: Christofer Lindheimer, Vadstena (SE); Tomas Frankkila, Luleå (SE); Malik Wahaj Arshad, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,852

(22) Filed: Dec. 12, 2023

(65) Prior Publication Data

US 2024/0129383 A1  Apr. 18, 2024

Related U.S. Application Data

(63) Continuation of application No. 17/428,420, filed as application No. PCT/SE2020/050130 on Feb. 10, 2020, now Pat. No. 11,888,961.

(Continued)

(51) Int. Cl.
*H04L 69/24* (2022.01)
*H04L 69/166* (2022.01)
(Continued)

(52) U.S. Cl.
CPC ............ *H04L 69/24* (2013.01); *H04L 69/166* (2013.01); *H04W 8/24* (2013.01); *H04W 28/18* (2013.01); *H04W 80/00* (2013.01)

(58) Field of Classification Search
CPC ....... H04L 69/24; H04L 69/166; H04L 80/00; H04L 65/1066; H04L 67/14; H04L 67/51;
(Continued)

(56) References Cited

U.S. PATENT DOCUMENTS

2011/0126198 A1* 5/2011 Vilke ................... G06F 9/54
 709/227
2015/0264637 A1* 9/2015 Zaus ................... H04W 8/22
 455/434

(Continued)

FOREIGN PATENT DOCUMENTS

CN 102209365 A 10/2011
CN 102291711 A 12/2011
(Continued)

OTHER PUBLICATIONS

"Email discussion 103bis#23: Relation of feature sets and band combinations", 3GPP TSG-RAN WG2 #104, Tdoc R2-1817821, Ericsson, Spokane, USA, Nov. 12-16, 2018, 30 pages.
(Continued)

*Primary Examiner* — Mewale A Ambaye
(74) *Attorney, Agent, or Firm* — Murphy, Bilak & Homiller, PLLC

(57) ABSTRACT

A wireless device according to one or more embodiments receives a request from a base station for capability information, with the wireless device transmitting the capability information in segments, responsive to the request indicating that the base station supports a protocol that utilizes segmentation for reporting the capability information. A base station according to one or more embodiments transmits a request for capability information to a wireless device. The request indicates the base station supports a protocol utilizing segmentation for reporting the capability information and the base station receives the capability
(Continued)

information in segments, as transmitted by the wireless device.

16 Claims, 20 Drawing Sheets

Related U.S. Application Data

(60) Provisional application No. 62/805,473, filed on Feb. 14, 2019.

(51) Int. Cl.
*H04W 8/24* (2009.01)
*H04W 28/18* (2009.01)
*H04W 80/00* (2009.01)

(58) Field of Classification Search
CPC ........ H04L 67/01; H04W 8/24; H04W 60/06; H04W 1/0001
See application file for complete search history.

(56) References Cited

U.S. PATENT DOCUMENTS

| | | | |
|---|---|---|---|
| 2016/0006837 A1* | 1/2016 | Reynolds | ............... H04L 67/34 709/203 |
| 2016/0165481 A1 | 6/2016 | Jin | |
| 2016/0286003 A1* | 9/2016 | Pessis | .................... G06F 9/541 |
| 2020/0045560 A1* | 2/2020 | Vermani | ................ H04B 7/024 |
| 2023/0208607 A1* | 6/2023 | Lim | ..................... H04L 5/0048 370/280 |
| 2023/0388997 A1* | 11/2023 | Mondal | ................ H04L 5/0023 |

FOREIGN PATENT DOCUMENTS

| | | |
|---|---|---|
| CN | 102413575 A | 4/2012 |
| CN | 103580781 A | 2/2014 |
| CN | 106792647 A | 5/2017 |
| CN | 108093397 A | 5/2018 |
| EP | 1370044 A2 * | 12/2003 ............. H04L 69/18 |
| EP | 1445908 A1 * | 8/2004 ............. H04L 69/18 |
| EP | 1564936 A2 | 8/2005 |
| JP | 2017509234 A | 3/2017 |
| WO | 2007082036 A1 | 7/2007 |
| WO | 2018039974 A1 | 3/2018 |

OTHER PUBLICATIONS

"Further aspects of Capability ID signalling options", 3GPP TSG-RAN WG2 #104, Tdoc R2-1817984, Ericsson, Spokane, USA, Nov. 12-16, 2018, 6 pages.

"Report on email discussion 103bis#29 on RRC segmentation", 3GPP TSG-RAN WG2 #104, Tdoc R2-1818448, Ericsson, Spokane, USA, Nov. 12-16, 2018, 11 pages.

"Segmentation Awareness in UE and Network", 3GPP TSG-RAN WG2 Meeting #104, R2-1816430, vivo, Spokane, USA, Nov. 12-16, 2018, 4 pages.

"TP on Combination Solutions for Capability Signalling Optimization", 3GPP TSG-RAN WG2 Meeting #104, R2-1816953, CATT, Spokane, USA, Nov. 12-16, 2018, 5 pages.

"UE Capability Compression", 3GPP TSG-RAN WG2 Meeting #104, R2-1818226, Apple, Spokane, USA, Nov. 12-16, 2018, 3 pages.

3GPP , "3GPP TR 23.743 V1.1.0", 3rd Generation Partnership Project; Technical Specification Group Services and System Aspects; Study on optimisations of UE radio capability signalling (Release 16), Jan. 2019, 1-55.

3GPP , "3rd Generation Partnership Project; Technical Specification Group Radio Access Network; NG-RAN; NG Application Protocol (NGAP) (Release 15)", 3GPP TS 38.413 V15.2.0, Dec. 2018, 1-308.

3GPP , "3rd Generation Partnership Project; Technical Specification Group Radio Access Network; NR; Radio Resource Control (RRC) protocol specification (Release 15)", 3GPP TS 38.331 V15.4.0, Dec. 2018, 1-474.

3GPP , "3rd Generation Partnership Project; Technical Specification Group Services and System Aspects; System Architecture for the 5G System; Stage 2 (Release 15) 3GPP TS 23.501 V15.4.0", 3GPP TS 23.501 V15.4.0, Dec. 2018, 1-236.

* cited by examiner

METHODS AND APPARATUS FOR TRANSMITTING CAPABILITY INFORMATION

RELATED APPLICATIONS

This application is a continuation of U.S. application Ser. No. 17/428,420 filed 4 Aug. 2021, which is a U.S. National Phase of PCT/SE2020/050130 filed 10 Feb. 2020, which claims benefit of Provisional Application No. 62/805,473 filed 14 Feb. 2019. The entire contents of each aforementioned application is incorporated herein by reference.

TECHNICAL FIELD

Embodiments of the present disclosure relate to methods and apparatus in networks, and particularly wireless devices, base stations and methods in wireless devices and base stations for transmission and reception of capability information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Embodiments described herein relate to User Equipment (UE) capability information and the transmission of capability information from a wireless device to a base station or network node, for example a Radio Access Network (RAN) node (e.g., NG-RAN node, gNB, ng-eNB).

There may be different types of wireless devices in a communications network. The 3rd Generation Partnership Project (3GPP) standardize different standards for wireless communication, for example. Global System for Mobile Communications (GSM), Wideband Code Division Multiple Access (WCDMA), Long Term Evolution (LTE) and now also New Radio (NR), the new generation commonly referred to as "5G". These different abbreviations are denotations of different radio access technologies. Wireless devices operating in these networks may be capable of communicating using one of these technologies/generations, or they may support several different technologies. Similarly, there may be many different frequencies that are being used for wireless communication and some wireless devices may support communication on some frequency bands whereas other wireless devices may support communication on other frequency bands. Also, for each frequency band, there may be different levels of complexity in supporting, for example, different amounts of input/output streams, for example, Multiple Input Multiple Output (MIMO) streams and this may mean that to properly describe what functionality a particular wireless device is capable of supporting in any one moment may require complex information and/or a large amount of information.

In 3GPP, a wireless device may inform the network about the communication capabilities of the wireless device. The wireless device may do this such that the network will have information available in order to determine how best to configure communication paths or connections between the wireless device and the network. These connections may be, for example, communication connections to the radio access nodes (for example, in 3GPP the radio access nodes may be known as gNB for NR/5G, and eNB for LTE/EUTRA). With the capability information of the wireless device available in the RAN nodes, it may be possible for the network to determine which features of the network to turn on and activate, and which features not to activate etc., which may be for example specific for different frequencies etc. However, by adding more and more features and supporting more and more frequencies in the standard, the UE Radio Capabilities specified by 3GPP have increased in size, making the transmission of the UE Radio capability information very costly in terms of network resource usage as well as processing in both the wireless device and the network nodes when the capability information needs to be transferred between relevant network entities, for example, between the wireless device (or UE), the Access and Mobility Management Function (AMF) and the Next Generation Radio Access Network (NG-RAN).

In some examples, the amount of capability information is too much for the wireless device to transfer all of the capability information.

In particular, it may be beneficial to improve the interface signaling, processing in the nodes and memory usage involved in the transmission of capability information. There may be a need to enable the transfer of the capability information at all, i.e., it may be beneficial to provide protocol improvements.

FIG. 1 illustrates an enquiry-information procedure between a user equipment UE (or wireless device) and a NG RAN node used to transfer capability information in NR.

In step 101 as shown in FIG. 1, the network transmits a UECapabilityEnquiry to the UE. The UECapabilityEnquiry requests that the UE transmit capability information to the network. The network may initiate the procedure by sending the UECapabilityEnquiry to a UE in RRC_CONNECTED when it needs (additional) UE radio access capability information.

The UE receives the UECapabilityEnquiry and will then determine what capability information that is requested. This can be referred to as a "filter" as it actually indicates to the UE, from all possible elements in the capability information, it should filter out a certain set of elements and transmit only the capability information requested. It does so by reading a UE-CapabilityRAT-RequestList indicating what radio access technologies that the gNB requests capability information for. This may include different indications, e.g., that the UE should provide information about NR capabilities, E-UTRA capabilities or even situations for when the UE may be simultaneously connected to both radio accesses.

For each access/Radio Access Technology (RAT) type, the UE may include information about: supported band combinations, features and feature combinations. The UE may ensure that the feature set IDs and feature set combination IDs are consistent across feature sets, feature set combinations and band combinations in all UE capability containers (per RAT) that the network queries with the same FreqBandList and with the same eutra-nr-only flag (where applicable).

Currently, if the UE cannot include all feature sets and feature set combinations due to message size or list size constraints, it is up to UE implementation which feature sets and feature set combinations it prioritizes for transmission as part of the UECapabilityInformation.

The UE may compile a list of "candidate band combinations" only consisting of bands included in FreqBandList, which may be prioritized in the order of FreqBandList (i.e. first include band combinations containing the first-listed band, then include remaining band combinations containing the second-listed band, and so on).

The procedure above describes the sequence for transmitting capability information between UE and gNB. Typically this information may be stored together with other information in the NG-RAN node for as long as the UE is connected to the NG RAN node, or it is in RRC_INACTIVE.

The capability information associated with the UE may also be stored in the context in the Access and Mobility Management Function (AMF). In these examples, then the capability information may be transferred over the NGAP/N2 interface for storing in the AMF. The procedure for this may be referred to as UE radio capability info indication and is illustrated in FIG. 1B.

The purpose of the UE Radio Capability Info Indication procedure may be to enable the NG-RAN node to provide the AMF with UE radio capability-related information. The procedure may use UE-associated signalling.

The NG-RAN node controlling a UE-associated logical NG connection may initiate the procedure by sending a UE RADIO CAPABILITY INFO INDICATION message to the AMF including the UE radio capability information.

The UE RADIO CAPABILITY INFO INDICATION message may also include paging specific UE radio capability information within the UE Radio Capability for Paging IE.

The UE radio capability information received by the AMF may replace previously stored corresponding UE radio capability information in the AMF for the UE.

In some examples, instead of transferring complete capability information, a Capability ID is transferred from the UE to the network. The Capability ID may then map to a specific capability information set that may be stored in the network. If the mapping between Capability ID and the actual capability information is available on the network side, then the cost of the UE altering the network as to its capabilities can be decreased in that the size of the Capability ID can be made a lot smaller than the actual capability information. The UE need therefore only transmit the Capability ID as a representation of the capability information. The network may then determine the actual capability information for the UE from the mapping between the Capability ID and the specific capability information set.

Generally, the network nodes and the UE may be required to have a corresponding understanding of what capability information is mapped to a certain Capability ID.

The advantages of the use of a Capability ID include that it may be more efficient to signal. If the capabilities are associated and stored with each UE, it may be more efficient to just store a Capability ID than the full capability information for all UEs. The capability information would then only need to be stored in a mapping table once. This may save memory. Similarly, parsing capability information in the network nodes may be a costly process from a processing perspective and to, subsequent to this, produce a configuration of all possible configurations may also increase processing. If it would be possible to map certain pre-configured configurations and have already a set of parsed capabilities at hand and map to an ID, this may also lead to advantages regarding processing load.

Two examples of Capability IDs may be:
1) A Manufacturer-assigned UE Capability ID: The UE Capability ID may be assigned by the UE manufacturer; in which case it may be accompanied with the UE manufacturer information (e.g. Type Approval Code (TAC) field in the Permanent Equipment Identifier (PEI)). In this case, the UE Capability ID may uniquely identify a set of UE Radio Capabilities for this manufacturer and device, and together with this UE manufacturer information, may uniquely identify this set of UE Radio Capabilities in any Public Land Mobile Network (PLMN);
2) A PLMN-specific Capability ID: If a manufacturer-assigned UE Capability ID is not used by the UE or the serving network, or it is not recognised by the serving network, the serving core network may allocate UE Capability IDs for the UE corresponding to different sets of UE Radio Capabilities the PLMN may receive at different times from the UE. In this case, the UE Capability IDs that the UE receives may be applicable to the serving PLMN and may uniquely identify the corresponding sets of UE Radio Capabilities in this PLMN.

If a UE Capability ID is assigned by a PLMN when a UE capability filter is used, then the UE Capability ID may be related to the Capability Filter.

The network or the Manufacturer may be able to change the UE Capability ID associated with a device, e.g., due to a SW upgrade enabling new UE Radio Capabilities on the device side (for the manufacturer assigned UE Capability ID) in the network side.

At any given instant the UE may only have one UE Capability ID that is indicated to the network.

The mapping between a specific Capability ID and the corresponding capability information may not change once set.

Owing to the need to support UE Radio Capabilities information size exceeding 65 536 bytes (i.e. >524 288 bits), and the need to support fast, reliable, low processing complexity mechanisms for frequently used procedures (at least Service Request, RRC Connection Resume, X2&Xn handover, secondary gNB addition), the full UE Radio Capabilities (in other words all of the capability information associated with a UE) may not normally be transferred as part of those procedures. This requires that the serving and target RAN stores a local copy of the mapping between the UE Capability IDs and the full UE Radio Capabilities for the UEs that frequently use that RAN node.

If a UE Capability ID assigned by a PLMN is the result of the UE signalling capability information related to a UE capability filter provided by the network, the UE Capability ID may be stored alongside (a reference to) the filter which was used when the capabilities associated to the ID were signalled.

An AMF that supports Capability IDs may be mandated to have access to all capability information for a UE and the mapping between UE Capability ID and the corresponding capability information for at least the UEs registered in this AMF.

An NG-RAN that supports Capability IDs, may be mandated to be able to maintain local storage of UE Radio Capabilities, and to have access to the mapping between the UE Capability ID and all capability information for a UE.

A specific NG-RAN node that does not have the mapping between a specific UE Capability ID and the corresponding UE Radio Capabilities, may be able to retrieve the mapping from the core network (CN).

The serving AMF stores the UE Capability ID in the UE context, if received, and may provide the Capability ID to NG-RAN via N2 message, e.g. INITIAL CONTEXT SETUP REQUEST.

For UEs that are already assigned with an applicable UE Capability ID, it may be mandatory to signal the UE Capability ID in an Initial Registration. If both PLMN assigned and manufacturer assigned UE Capability IDs are available, the UE may signal the PLMN assigned UE Capability ID.

To allow for a mix of upgraded and non-upgraded RAN nodes over the X2/Xn interfaces, the UE Capability ID may be included in the Path Switch signalling between Mobility Management Entity (MME)/AMF and RAN.

For backwards compatibility between nodes that support Capability IDs and nodes that do not support Capability IDs, if a peer node is not supporting Capability IDs, the source node may attempt to send to the peer node the UE capability information that map to the UE Capability ID. However, owing to message size limits, this may lead to an inter-CN node handover systematically failing, or requiring the retrieval of the UE capability information across the target RAN node's radio interface.

When a UE Capability ID is associated to a UE capability filter, the association to this filter may be conveyed over the signalling interfaces when a mapping between the UE Capability ID and the UE capability information is provided. This may include the interface between the UE and the Network.

In addition to the above, a Capability ID may be provided in different ways. For example, one possible way to provide a Capability ID is to perform a hash operation on the capability information. For example, the UE may calculate a HASH value of a set of the capability information associated with the UE and may transmit the HASH value to network and the network will determinate if a corresponding set of capability information is already available. If the corresponding set of capability information is not available, then the capability information may need to be retrieved from the UE. When the network then receives the capability information, the RAN may need to calculate the HASH value in order to validate that the HASH value corresponds to the previously received hash value before the received capability information is accepted.

For example, two options for using a HASH to provide a Capability ID are:
1) With the assumption that each subset of UE Radio Capabilities is calculated with SHA-256 hash the probability is very low that two different UE Radio Capabilities have the same hash value so there may not be any solution provided for this scenario.
2) The UE Capability ID may be extended to also include a device manufacturer unique identifier, this may be, for example, the TAC code. The UE vendor/manufacturer may also need to ensure that two different UE Radio Capabilities do not produce the same HASH value when the order of the two individual UE Radio Capabilities are re-arranged, to ensure a unique hash.

There currently exist certain challenge(s). One of the aspects of transmitting the Capability ID is that there is a need to have the same understanding of what the Capability ID maps to in both the UE and the network. In other words, one of the challenges is to always maintain a correct view of what the Capability ID means, what capability information it maps to. The network nodes and the UE may therefore be required to have the same understanding of this.

In some situations, it may anyway be needed to utilize the capability enquiry/information procedure as described above with reference to FIG. 1, and in these situations, it may be needed to work and support the information that is necessary to transfer. Thus, it may be desirable to improve the enquiry/information procedure in order to support the situations (however few, e.g., with support from Capability ID solutions) when there is actually a need to transfer a lot of capability information.

If these mechanisms to improve the enquiry/information procedure are found and introduced (currently segmentation and compression are examples of such mechanisms as will be described later) there is a need for the network and the UE to agree on which of these mechanisms to use for transmission of the capability information. This pose a challenge, as, at the enquiry/information procedure, there has not yet been any transmission of capability information from the UE, so the network may not be aware of which, if any, of the mechanisms that the UE supports.

Similarly, there may be a need for the network to be able to select a capability transmission method that it both supports and prioritizes.

When compression is used, several different compression protocols may be supported. Different compression protocols may have different properties, for example when it comes to processing and memory requirements. For example, compression protocol A may be more complex and may require storage of larger dictionaries and states that compression protocol B, but protocol A may also provide better compression than B.

Some compression protocols may be configured in several ways. For example, for gzip there are configuration parameters to configure the compression to be either fast, or to compress as much as possible. An extract of the manual page for gzip on Unix systems, available at https://www.freebsd.org/cgi/man.cgi?gzip as of 6 Jan. 2020, shows:

```
GZIP(1)           BSD General Commands Manual          GZIP(1)
NAME
   gzip -- compression/decompression tool using Lempel-Ziv coding (LZ77)
SYNOPSIS
   gzip [-cdfhkLlNnqrtVv] [-S suffix] file [file [...]]
   gunzip [-cfhkLNqrtVv] [-S suffix] file [file [...]]
   zcat [-fhV] file [file[...]]
DESCRIPTION
   The gzip program compresses and decompresses files using Lempel-Ziv coding (LZ77). If no
   files are specified, gzip will compress from standard input, or decompress to standard out-
   put. When in compression mode, each file will be replaced with another file with the suffix,
   set by the -S suffix option, added, if possible.
```

-continued

```
In decompression mode, each file will be checked for existence, as will the file with the
suffix added. Each file argument must contain a separate complete archive; when multiple
files are indicated, each is decompressed in turn.
In the case of gzcat the resulting data is then concatenated in the manner of cat(1).
If invoked as gunzip then the -d option is enabled. If invoked as zcat or gzcat then both
the -c and -d options are enabled.
This version of gzip is also capable of decompressing files compressed using compress(1).
bzip2(1), or xz(1).
OPTIONS
  The following options are available:
  -1, --fast
  -2, -3, -4, -5, -6, -7, -8
  -9, --best   These options change the compression level used, with the -1 option being
               the fastest, with less compression, and the -9 option being the slowest,
               with optimal compression. The default compression level is 6.
...remaining text removed...
```

A consequence of supporting several compression protocols and/or configuration options within each protocol without any indication from the network is that the UE may choose to use a compression method or configuration that is suboptimal for the network. For example, using a compression method that requires a lot of processing and/or memory might be acceptable under some operating conditions. However, for other operating conditions, the unit that does the decompression may already be heavily loaded, in which case it would be beneficial to use a compression method or configuration that is less complex and/or needs less storage.

Furthermore, this also means that more testing and verification may be needed before the implementation can be deployed in a commercial network.

Existing methods do not provide any means for indicating which compression protocol or configuration that is currently preferred over other compression protocols or configurations.

Example references include TS 38.331 v 15.4.0, which specifies the Radio Resource Control protocol for the radio interface between UE and NG-RAN; TS 38.413 v 15.2.0, which specifies the radio network layer signalling protocol for the NG interface; TR 23.743 v 1.1.0, which considers optimizations of system procedures pertaining to the transfer UE Radio Capabilities related information to RAN, and optimizations of system procedures related to transfer UE Radio Capabilities impacting the Core Network; and TS 23.501 v 15.4.0, which defines the Stage 2 system architecture for the 5G System. The 5G System provides data connectivity and services.

SUMMARY

It is an object of the present disclosure to improve the efficiency of UE capability information transfer, thereby minimising processor usage, memory usage and interface signaling requirements.

Embodiments of the disclosure aim to provide apparatus and methods that alleviate some or all of the issues identified.

An aspect of an embodiment of the disclosure provides a method performed by a wireless device for transmitting capability information to a base station in a network, the method comprising: receiving an indication of one or more protocols that are supported by the network for transmission of capability information; responsive to the wireless device supporting at least one of the one or more protocols for transmission of capability information, selecting a first protocol that is supported by the wireless device from the at least one of the one or more protocols, and transmitting capability information associated with the wireless device to the base station according to the first protocol.

A further aspect of an embodiment of the disclosure provides a method performed by a base station for controlling the receipt of capability information from a wireless device at the base station, the method comprising: initiating transmission of an indication of one or more protocols that are supported by the network for transmission of capability information; and responsive to the wireless device supporting at least one of the one or more protocols, receiving capability information associated with the wireless device according to a first protocol of the one or more protocols.

A still further aspect of an embodiment of the disclosure provides a wireless device for transmitting capability information to a base station in a network, the wireless device comprising: processing circuitry configured to perform the steps of: receiving an indication of one or more protocols that are supported by the network for transmission of capability information; responsive to the wireless device supporting at least one of the one or more protocols for transmission of capability information, selecting a first protocol that is supported by the wireless device from the at least one of the one or more protocols, and transmitting capability information associated with the wireless device to the base station according to the first protocol; and power supply circuitry configured to supply power to the wireless device.

A yet further aspect of an embodiment of the disclosure provides a base station for controlling the receipt of capability information from a wireless device, the base station comprising: processing circuitry configured to perform any of the steps of: initiating transmission of an indication of one or more protocols that are supported by the network for transmission of capability information; and responsive to the wireless device supporting at least one of the one or more protocols, receiving capability information associated with the wireless device according to a first protocol of the one or more protocols; and power supply circuitry configured to supply power to the base station

BRIEF DESCRIPTION OF THE DRAWINGS

For a better understanding of the present disclosure, and to show how it may be put into effect, reference will now be made, by way of example only, to the accompanying drawings, in which.

DETAILED DESCRIPTION

Figure 1A:
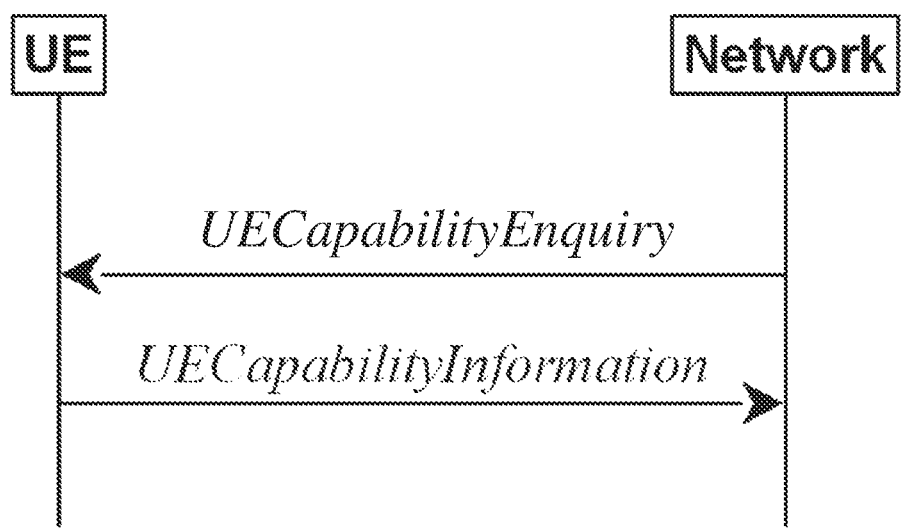
FIG. 1A is a signaling diagram of a UE capability information transfer procedure.
Figure 1B:
FIG. 1B is a signaling diagram of a UE radio capability info indication transfer procedure.

Certain aspects of the present disclosure and their embodiments may provide solutions to these or other challenges. In some embodiments, the network is able to transmit an indication of one or more protocols that are supported by the base station for transmission of capability information. The indication may also identify a priority associated with each of the one or more protocols. This may therefore be an indication to the UE both what transmission protocols the network supports and which of those protocols the base station prefers.

In some embodiments, the UE may, among all the protocols for transmission of capability information that it supports, select a protocol that is associated with a highest priority from a network/gNB indication.

If the UE doesn't support any of the capability transmission method, it may fall back to a lowest priority or a legacy protocol that the UE is aware is supported by the network.

In some embodiments, the indication from the base station further comprises a size indication associated with each of the one or more protocols respectively, wherein the size indicator indicates one of: a maximum size of a message to be transmitted by the wireless device comprising the capability information, or a number of messages to be transmitted by the wireless device to transmit the capability information. The size indication can be expressed in, e.g., bits, or in number of segments for the transmission method that relates to segmentation for example.

In some embodiments, the indication identifies a filter associated with each of the one or more protocols respectively, wherein the filter indicates which capability information the wireless device should transmit according to the associated protocol. If there is a list received from the network of different prioritized protocols, these can also have an associated filter. This means that, e.g., if the UE supports a protocol that allows for transmission of a lot of capability information, the base station may be interested in the UE transmitting as much capability information as possible, whereas if the UE is only supporting a protocol that allows for much less capability information to be transmitted, then the base station may be interested in a subset of the capability information.

In some examples, the one or more protocols may comprise a plurality of protocols utilizing compression. The indication may indicate that some protocols utilizing compression are more suitable to use than others.

The priority indication can be performed in several different ways. For example, one possibility is to associate a priority value with each indicated protocol. Another possibility is to sort the list of protocols into priority order (increasing or decreasing) such that the UE would understand which protocol is the preferred protocol from the list, based on the order in which the protocols are listed.

There are, proposed herein, various embodiments which address one or more of the issues disclosed herein.

Certain embodiments may provide one or more of the following technical advantage(s). Embodiments described herein address the problem of indicating a capability transmission method from the gNB/network to the UE without knowing what the UE is supporting.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments will now be described with reference to the 5G system and architecture for 5G and various state machines.

One "state machine" is the connection management state model or CM-state model.

Generally, connection management comprises of functions for establishing and releasing signaling connections between a UE and core network node, for 5G this node may be an AMF (Access and Mobility Management Function).

Figure 2:
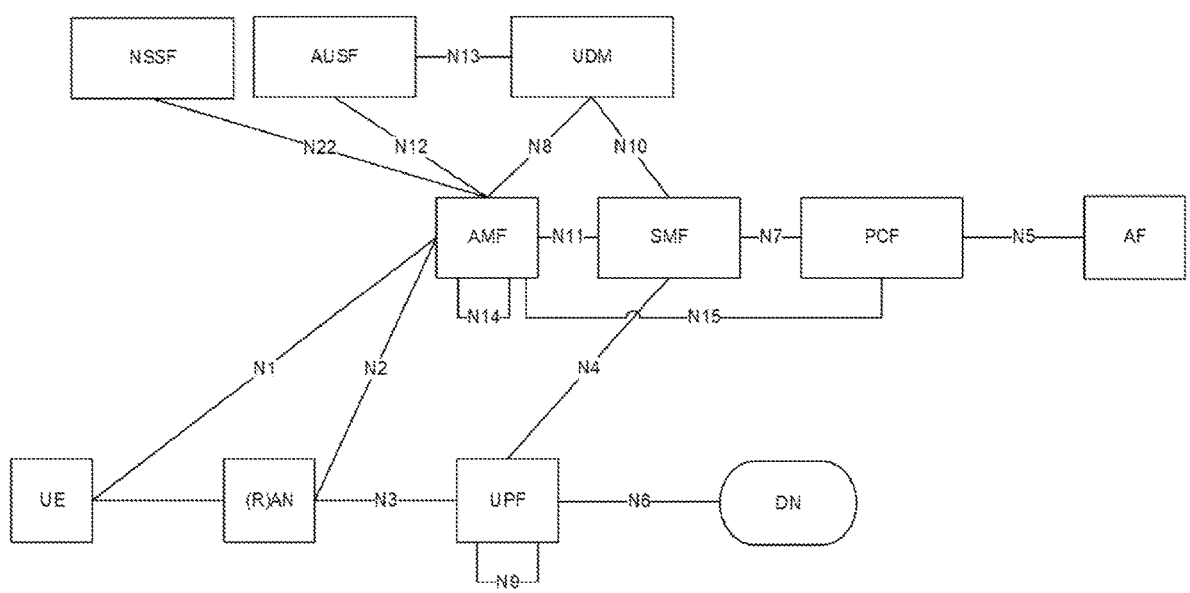
FIG. 2 is a diagram illustrating an example of a 5G system architecture.

FIG. 2 illustrates an example of a 5G system architecture, including Nodes (e.g., AMF, UE, (R)AN) and interface names. Connection management may relate to signaling connection over the N1 interface illustrated in FIG. 2.

The signaling connection over N1 may be used to enable Non-Access-Stratum (NAS) signaling exchange between the UE and the core network. The N1 interface may comprise both the access node (AN) signaling connection between the UE and the AN (Access Node) and the N2 connection, between the AN and the AMF (as also shown in FIG. 2).

There may be two CM-states defined, CM-IDLE and CM-CONNECTED.

A UE in CM-IDLE may have no NAS signaling connection established over N1 to the AMF whereas if it is in CM-CONNECTED, there is a signaling connection.

In a similar way as in the AMF, there may also be a state model in the AN, the access network.

Hereafter, the term "gNB" is used for the access network node, but it may equally well be another node type, e.g., an ng-eNB, an eNB. The term "gNB" shall thus be considered an example, rather than a limitation in the applicability of the present disclosure.

Figure 3:
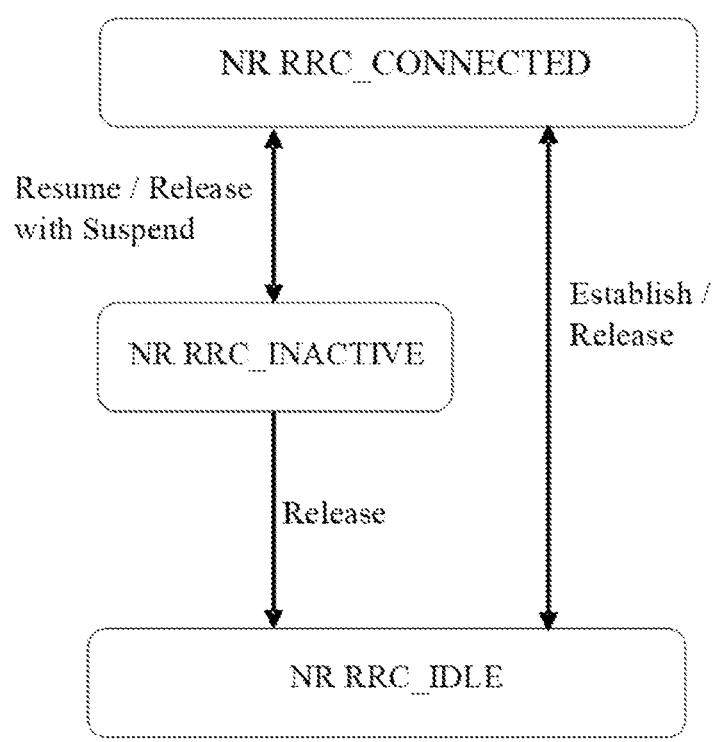
FIG. 3 is a diagram of a RRC State machine.

One state model in the gNB is the RRC State machine, as illustrated in FIG. 3.

A UE may either be in RRC_CONNECTED, RRC_INACTIVE or RRC_IDLE.

FIG. 3 illustrates the intention with which the RRC State machine will work, and the messages used to trigger/transition a UE between the states. The figure shows the principles for transition.

The mapping between the different state machines, the one in the AN and the one in AMF (such as those shown in FIGS. 2 and 3), is such that CM-CONNECTED can map to either RRC_CONNECTED or RRC_INACTIVE—while CM-IDLE always map to RRC_IDLE.

A UE is either in RRC_CONNECTED state or in RRC_INACTIVE state when an RRC connection has been established. If this is not the case, i.e. no RRC connection is established, the UE is in RRC_IDLE state.

When, for example, a UE registers with the network a signaling sequence takes place that starts with the UE sending an RRC setup request/establishment request to an NG-RAN node. This request is sent to establish a signaling connection that would allow transmission of control messages, both to RAN, but also messages that go to a core network node, such as an AMF over the N1 interface. In example embodiments of the present disclosure, the main interfaces involved are:
1) The interface between the AMF and the NG RAN node (e.g., gNB, ng-eNB) This is referred to as NGAP or N2 interface.
2) The interface between the AMF and the UE. This is referred to as the N1 interface. Sometimes the term NAS signaling will be mentioned. This refers to signaling that is sent on the N1 interface, i.e., it is not interpreted by the NG-RAN node even though of course the RAN node is involved in forwarding the NAS messages.
3) The interface between the NG-RAN node and the UE. This is referred to as the Uu interface and the relevant signaling protocol over this interface is the RRC, the Radio Resource Control Protocol.

Turning now to the signaling, mainly between these nodes, in connection to an initial registration scenario.

Figure 4:
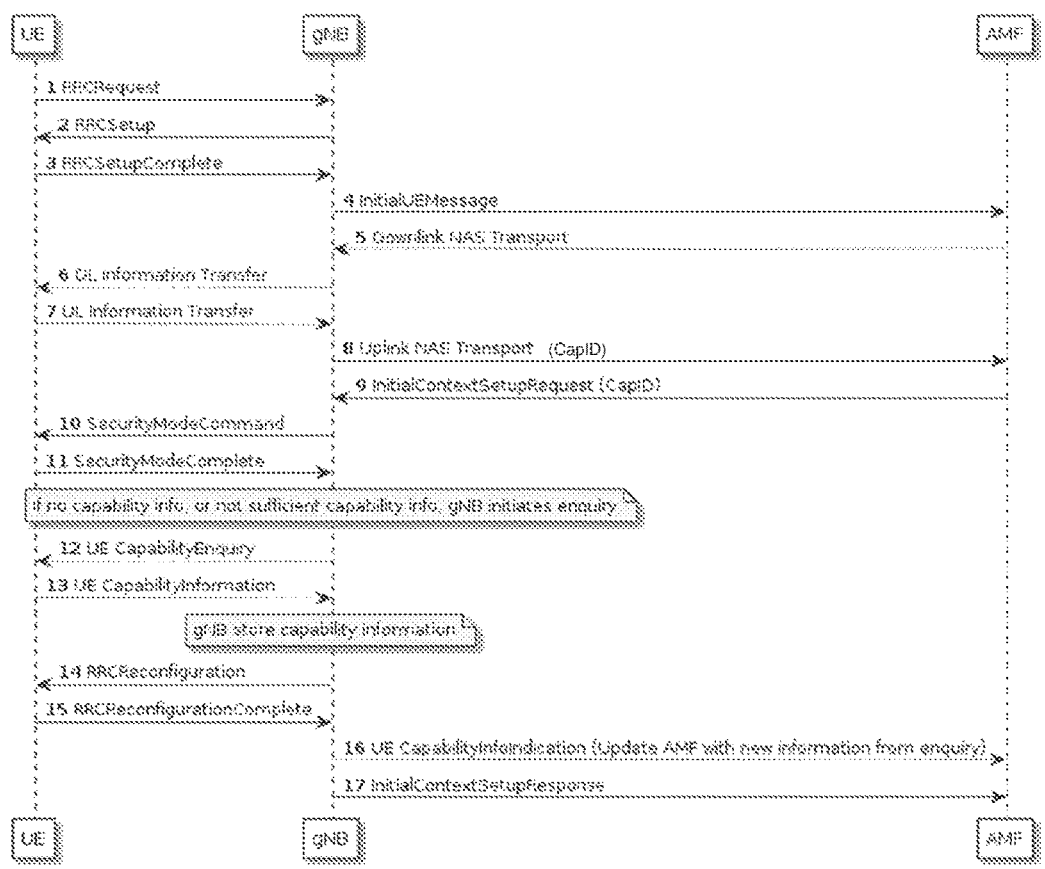
FIG. 4 is a signaling diagram illustrating an example of use of a capacity ID.

While there may be variations to the sequence of signalling, and different radio access technologies have different naming conventions on the signals, the illustration included in FIG. 4 depicts an example of use of a Capability ID.

The signaling starts between a UE and gNB, with the setup of an RRC connection. Step 1-3 in FIG. 4 illustrate this. The setup complete message may include a piggybacked NAS message, or alternatively, the NAS transport in the uplink may happen after some information exchange between the gNB and the AMF after having sent the Initial UE message.

In one example the Capability ID may be included in the Initial UE message to the AMF. i.e., it includes that the NAS message piggybacked in the Setup Complete step 3. In this example, the Capability ID reaches the AMF prior to transmission of the InitialContextSetupRequest from the AMF to the gNB.

Once the InitialContextSetupRequest is received in the gNB, the gNB detects if there is a Capability ID it can interpret in the InitialContextSetupRequest and, in particular if there is sufficient capability information in the mapping of this Capability ID.

If the information corresponding to the Capability ID that is available in the gNB is not deemed sufficient, or alternatively, if no mapping data or perhaps not any explicit information either was available, neither in the AMF nor in the gNB, the gNB may need to commence the process of requesting capability information in the enquiry-information exchange between the gNB and the UE. It will be appreciated that this procedure is in this illustration executed after security command, i.e., after setup of security between the UE and the gNB. Dependent on the sensitivity level of the Capability ID this may be preferred. If the Capability ID is not sensitive to, e.g., eavesdropping, it may be possible to run the enquiry procedure prior to security is activated.

The information exchange in the enquiry/information may also include the actual Capability ID.

Once the capability information is received by the gNB, the gNB may then have all the capability information that it needs and gNB would then typically, in cases when the AMF didn't have any information, update the AMF with the capability information for that particular UE. The AMF will then indirectly also get mapping data, i.e., an interpretation of the Capability ID that it can also store in a mapping table.

According to some examples, signaling of capability information may also be addressed by actually optimizing the capability enquiry and the capability information transmission, not by replacing everything with a Capability ID, but by introducing other mechanisms.

The optimization of transmission in the enquiry-information exchange may be needed irrespective of if there is a Capability ID implemented or not. In certain networks, there may not be a solution for transmitting a Capability ID in the first place, and then, the UE capability enquiry/information procedure will always be used when capabilities are not available in any of the network nodes.

Thus, different protocols to improve transmission of capability information in the enquiry/information exchange are considered. As an example, a protocol utilising compression to transmit the capability information may be considered. With compression, it may be possible to reduce a lot of capability information to a smaller amount of capability information without losing content. Examples of compression are, e.g., well known zip-compression and gzip. It is generally referred to as loss-less compression as no data is really lost. To compress information, a dictionary may be used and then, instead of repetitively sending a long string, a shorter string, a shorter word is sent, according to the dictionary.

There may be different types of dictionaries and methods on how to treat them. In one example, the dictionary can be transmitted together with the actual capability information. Dictionaries may be, e.g., static or dynamic dependent on how changes to the dictionary are introduced. With compression algorithms, it may therefore be possible to take large amounts of information and represent it with a lesser amount. The efficiency of the compression will depend on variability of the actual data being compressed, the configuration of the compression method, and on the dictionary type used among other things. In some situations, it may even be possible that compression yield a longer sequence than the uncompressed string.

Another mechanism considered to transmit capability information from the UE to the network is to consider if it can be done by sending it not in one segment or message but in several segments. There is currently no method for transmitting capability information in more than one PDCP data unit and there are limitations to how much data this can contain. If however, it was possible to send several data units, it would be possible to send more data, which in this example, amounts to more capability information.

The maximum anticipated size for combined size of capability information for the E-UTRA. NR, new radio, and dual-connectivity (DC) radio capabilities might be very large (several tens of kilo-octets). Currently the PDCP protocol limits the single-shot capability signaling to 8188 octets in E-UTRAN and 9000 octets in NR.

Figure 5:
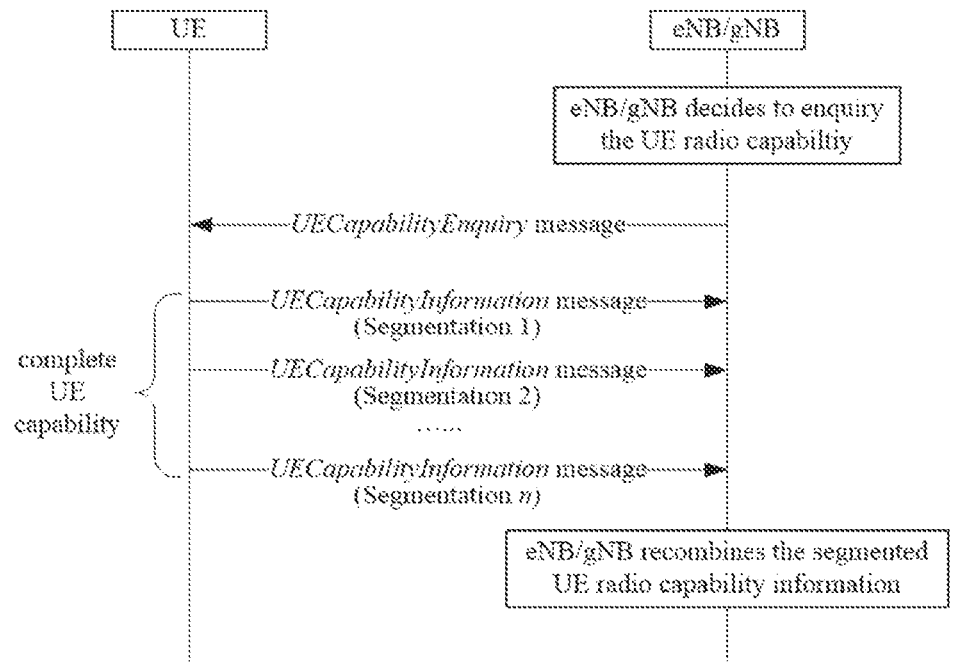
FIG. 5 is a diagram illustrating the segmenting of capability information.

Thus, RRC signaling could be segmented. In this way, a UE may provide the capability information in segments, each of having maximum size of 9000 bytes. An example of segmenting of capability information is illustrated in FIG. 5.

There are also different ways in which the segmentation may be standardized or done. For example, each segment may be decoded by the receiver, the gNB, or each segment may be sent such that all segments need to be gathered before it can be decoded.

Both compression and segmentation are considered as options for protocols that allow the UE to transfer more capability information to the network node, i.e., the NG-RAN node. Even combinations of these and other protocols may be considered.

Irrespective of what protocols are specified or supported by the network, it may be necessary for the network and the UE to be able to exchange information about which protocols it supports, and what protocol to use in a capability information transmission.

The network may typically broadcast necessary information to the UE that the UE needs to know to access the network from RRC_IDLE mode and RRC_INACTIVE mode. Once the UE is in RRC_CONNECTED, signalling can be made dedicated to specific UEs.

The only occasion when the UE transfers explicit capability information is in the capability enquiry/information procedure and this procedure may usually start from RRC_CONNECTED with the transmission of a UECapabilityEnquiry message, i.e., a request from the network, as described above. Thus, to determine what, of several possible available formats to transfer UE capability information, there is thus no need to broadcast any information, as the indication of which protocol(s) the UE may select may be included in the enquiry message.

One of the challenges is that the network has, at the point when it sends the enquiry, usually no information about what protocol(s) the UE supports. The UE may not necessarily have implemented all possible capability transmission protocols, and may only know, for example, how to send one RRC message without any compression. In other words, the UE may only be able to transmit capability using a legacy protocol, for example with no compression or segmentation.

Thus, in some examples, there may be at least three different protocols in which the UE may send capability information to the gNB in the UECapabilityInformation message:
  a) Capability information as the legacy way, e.g., one RRC segment, no compression
  b) Capability information in RRC segmented fashion, including more than one segment
  c) Capability information compressed with a compression algorithm (and possible options of this).
Combinations of these protocols may be used.

From this perspective, in some embodiments, a network node may initiate transmission to a wireless device of an indication of one or more protocols that are supported by the network for transmission of capability information. The network node may comprise the base station, or may comprise another network node, configured to provide control to the base station.

Responsive to the wireless device supporting at least one of the one or more protocols, the wireless device may then transmit capability information associated with the wireless device according a first protocol of the one or more protocols. In other words, the wireless device may select a protocol from the protocols supported by the network that the wireless device also supports.

In some examples, the indication identifies a priority associated with each of the one or more protocols. The wireless device may then select the first protocol by selecting a protocol associated with a highest priority from the at least one of the one or more protocols supported by the wireless device. In some cases, the "priority" may be seen as a defining a required behaviour that the wireless device should use, i.e. to select the protocol with the highest possible priority. An alternative is to use a priority to indicate a preference of the network node, that the wireless device may adhere to but the wireless device would still be allowed to use another protocol, if this is more preferable for the wireless device.

If the wireless device supports many protocols, but the network prioritizes usage of only one or two methods, then, the network node may not have to include all protocols that the base station supports.

The wireless device may therefore select the first protocol by selecting a protocol associated with a highest priority from the at least one of the one or more protocols supported by the wireless device. This way, it is possible to control, from the network, what protocol the wireless device selects to transfer capability invocation and at the same time doing this without knowing which protocols the wireless device supports.

The indication may identify a priority associated with each of the one or more protocols by listing the one or more protocols in order of priority.

The indication may identify a priority associated with each of the one or more protocols by associating each of the one or more protocols with an explicit priority value.

The following illustrates an example of an indication transmitted from the network to the wireless device:
  Capability message RRC Segmentation, 5
  Capability information-R15

This may then be interpreted by the wireless device as indicating that the network supports receiving capability information in up to 5 RRC segments (a first protocol) and prefers this over sending capability information according to Release 15 (i.e. the legacy protocol).

A second example indication may be:
Capability Compression, deflate-Segmentation, 3
Capability message RRC segmentation, 5
Capability information-R15

The above example indication would mean that the network also supports compression-deflate and that it prefers that, if wireless device also supports this protocol, that this protocol is used preferentially to receiving capability information in up to 5 RRC segments (a first protocol), which is used preferentially over sending capability information according to Release 15 (i.e. the legacy protocol).

The above example indication also identifies a size indication associated with at least one of the one or more protocols respectively, wherein the size indicator indicates one of: a maximum size of a message to be transmitted by the wireless device comprising the capability information, or a number of messages to be transmitted by the wireless device to transmit the capability information. In this example specifically, the size indicator indicates the number of segments or messages to be used by the wireless device to transmit the capability information.

This above example therefore illustrates that the highest priority protocol is to receive capability information compressed and deflated and sent in maximum 3 RRC segments. The 2nd priority is transmitting uncompressed information sent over maximum 5 RRC segments, and the lowest priority protocol is transmitting is capability information according to Release 15, aka the fall back transmission mode.

In another embodiment, the indication may comprise an indication of the type of Capability ID the network would prefer the wireless device to use, for example, the network may indicate:
PLMN assigned ID,
Vendor assigned ID
Hash based ID.

This may be interpreted as the network indicating that the preferred type of Capability ID is a PLMN assigned ID, followed by a vendor assigned ID, followed by a hash based ID. In some examples, the wireless device may include the Capability ID together with the requested capability information.

In some embodiments, the last (legacy) option may be omitted and considered a fall back if either the indication is not included at all (this would be the situation for networks that don't support any of the features) or if none of the indicated options are supported by the wireless device.

The option to send capability information explicitly, i.e., in the same way as the fallback method, may not therefore need to be indicated explicitly in the indication.

Since this information may only be relevant in connection to transmission of capability information, in some embodiments, this indication from the network is included in the UECapabilityEnquiry message. In another aspect, there is also an indication included in the UECapabilityInformation message, on what protocol the UE has selected, such that this is explicitly indicated to the network. It may be clear in some cases which protocol is used, e.g., based on how many segments the network receives, but it may be less clear in other cases, e.g., what compression algorithm that may be used for example.

In some examples therefore, a wireless device may follow the indication from the UECapabilityEnquiry message and select a protocol for UECapabilityInformation such that; if more than one protocol is indicated in the UECapabilityEnquiry message, the wireless device may select the highest prioritized method supported by the wireless device. However, if none of the indicated protocols, are supported by the wireless device, the wireless device may select the legacy protocol to transmit the UECapabilityInformation message accordingly. The wireless device may include an indication of the selected protocol in the UECapabilityInformation message.

When a protocol utilising compression is supported, the indication may also identify different priorities (or preferences) for different configuration options that may be available for the compression method. In other words, the one or more protocols may comprise a protocol utilizing compression, and the indication may identify a respective preference associated with each of a plurality of configuration options available for the protocol utilizing compression.

In the case that several protocols utilising compression are supported, the priority associated with each protocol, may comprise a priority associated with each of the different protocols utilising compression.

In alternative embodiments of the present invention, instead of signaling only one filter in the enquiry message, it may be possible to signal more than one filter, such that, dependent on what type of capability transmission the UE supports, it should send different amounts of information. In this way, there will be an automatic connect between what the network requests and what the UE can deliver with its capability signaling means.

In one example of this embodiment of the invention, the indication identifies a filter associated with each of the one or more protocols respectively, wherein the filter indicates which capability information the wireless device should transmit according to the associated protocol.

For example, the capability enquiry message may indicate:
Capability Compression, deflate—Segmentation, 4—Filter-1
Capability message RRC segmentation, 5—Filter-2
Capability information-R15—Filter-3

The difference in filter-1, -2, and -3 may be that to transmit all capability information according to Filter-1 may only be possible if it is connected with a specific transmission functionality. If this is not supported, the UE may instead, e.g., use Filter-3.

The scope of the disclosure is not restricted to capability signaling features such as specific compression and segmentation solutions, or even that both segmentation and compression are options. The connection to a specific filter may also be done in situations when there is a Capability ID for example, as described above, or if there is only support of capability segmentation. In one such example, the prioritized list from the network to the wireless device in the enquiry message may be:
RRC-Segmentation, 5—Filter-1
Capability information-R15—Filter-3

Thus, more generally, dependent on what feature the wireless device supports, it may select the highest priority protocol, and may prepare a response to send the capability information message according to that protocol.

In some embodiments therefore, the wireless device may follow the indication from the UECapabilityEnquiry message and may select a protocol for transmission of the UECapabilityInformation such that; if more than one protocol is indicated in the UECapabilityEnquiry message, the wireless device may select the highest prioritized protocol supported by the wireless device and may prepare capability information according this filter associated with the selected protocol. If no indicated protocol is supported by the wireless device, the wireless device may transmit UECapabilityInformation message according to R15 and prepare capability information according to this filter associated with the R15 legacy protocol. The wireless device may also include the selected protocol and filter in the UECapabilityInformation message.

Figure 6:
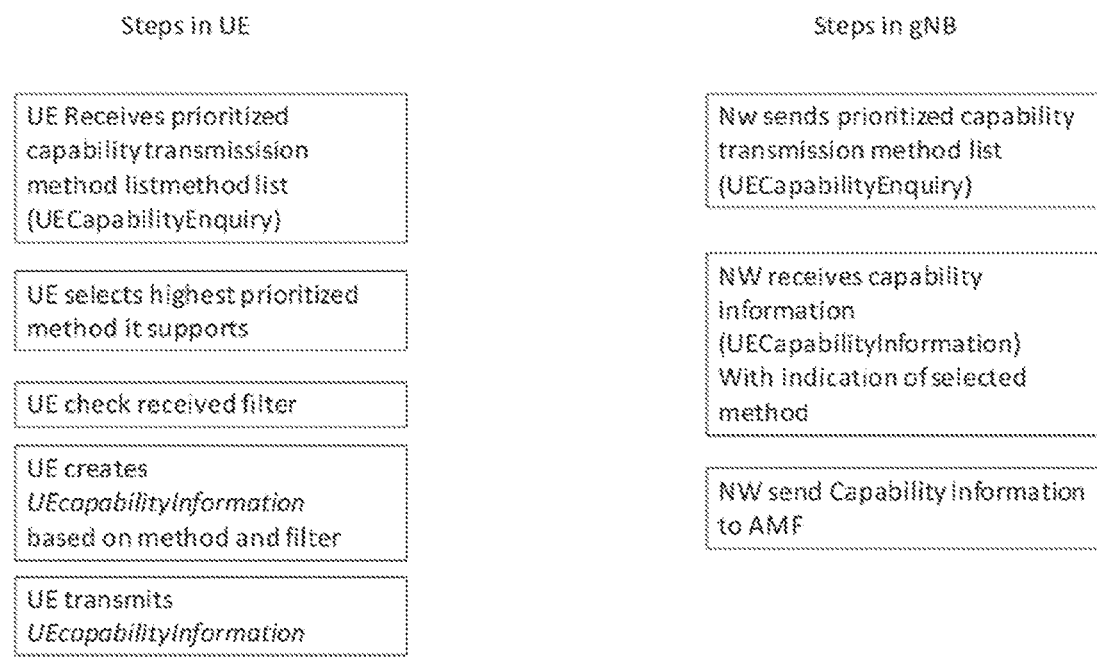
FIG. 6 is a diagram illustrating the steps performed by a wireless device and a gNB in an aspect of an embodiment.

FIG. 6 illustrates steps in the wireless device and in the gNB respectively according to an embodiment.

Changes in Specification

Figure 7:
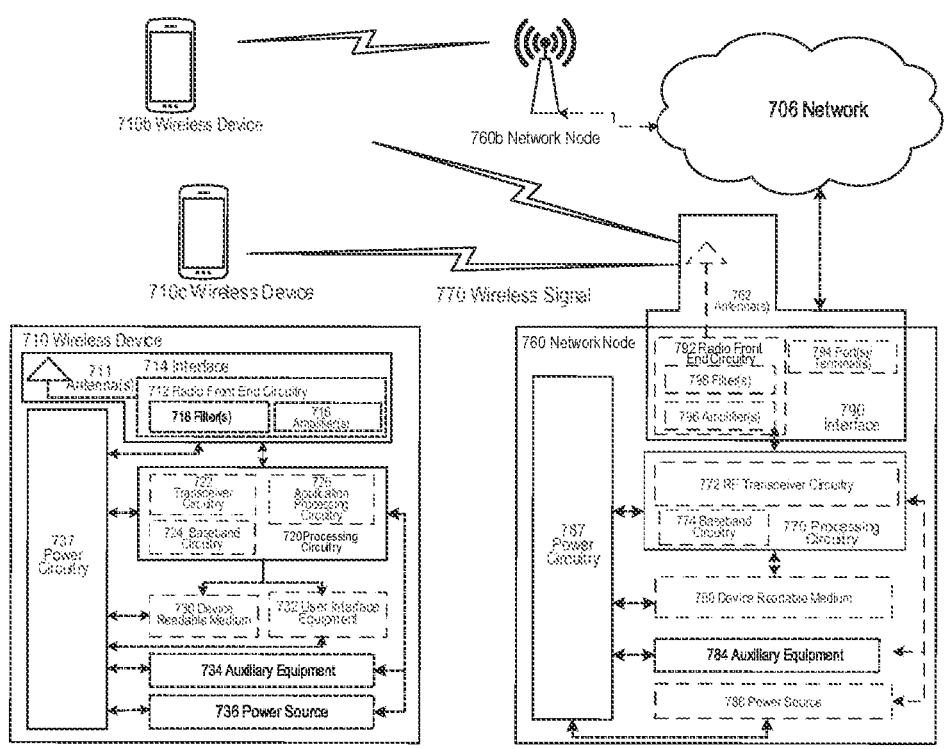
FIG. 7 is a schematic diagram of a wireless network in accordance with some embodiments.

Based on the embodiment shown in FIG. 6, the UECapabilityEnquiry message can be enhanced in the TS 38.331 specification using a new IE UE-CapabilitySignalling-RequestList as shown below:

ity, the wireless network of FIG. 7 only depicts network 706, network nodes 760 and 760b, and WDs 710, 710b, and 710c. The wireless devices 710, 710b, and 710c may be configured as a wireless device or UE as described in any embodiment above. The network nodes 760 and 760b may be configured as described in any embodiment above. In practice, a wireless network may further include any additional elements suitable to support communication between wireless devices or between a wireless device and another communication device, such as a landline telephone, a service

| UECapabilityEnquiry information element |
| --- |
| ```
-- ASN1START
--TAG-UECAPABILITYENQUIRY-START
UECapabilityEnquiry ::= SEQUENCE{
  rrc-TransactionIdentifier   RRC-TransactionIdentifier,
  criticalExtensions          CHOICE{
    ueCapabilityEnquiry       UECapabilityEnquiry-IEs,
    criticalExtensionsFuture  SEQUENCE{ }
  }
}
UECapabilityEnquiry-IEs ::= SEQUENCE{
  ue-CapabilityRAT-RequestList   UE-CapabilityRAT-RequestList,
  lateNonCriticalExtension       OCTET STRING                         OPTIONAL,
  nonCriticalExtension           UECapabilityEnquiry-IEs-v16                      OPTIONAL
}
UECapabilityEnquiry-IEs-v16-IEs ::= SEQUENCE{
        ue-CapabilityRAT-RequestList     UE-CapabilityRAT-RequestList,
        ue-CapabilitySignalling-RequestList   UE-CapabilitySignalling-RequestList,
        lateNonCriticalExtension         OCTET STRING                             OPTIONAL,
  nonCriticalExtension           SEQUENCE{ }                          OPTIONAL
}
-- TAG-UECAPABILITYENQUIRY-STOP
-- ASN1STOP
``` |

| UE-CapabilitySignalling-RequestList information element |
| --- |
| ```
-- ASN1START
--TAG-UE-CAPABILITYRAT-REQUESTLIST-START
UE-CapabilitySignalling-RequestList::=      SEQUENCE{
  signalling-Type          Signalling-Type,
      signalling-detail                                    Signalling-Detail
  ...
}
Signalling-Type ::=      SEQUENCE{
  Compression                      BIT STRING(SIZE(2))         OPTIONAL,
  Segmentation                     BIT STRING(SIZE(2))         OPTIONAL,
  Capability ID                    BIT STRING(SIZE(6))         OPTIONAL,
}
Signalling-Detail ::=    SEQUENCE{
  Compression-type ::=   SEQUENCE{
  Gzip                                     ENUMERATED{true}    OPTIONAL,
  Winzip                                   ENUMERATED{true}    OPTIONAL,
  Zip                                      ENUMERATED{true}    OPTIONAL,
  Dictionary-available     ENUMERATED{true}    OPTIONAL,
  ........
}
Signalling-ID-type SEQUENCE{
Vendor-assigned          ENUMERATED{true}       OPTIONAL,
PLMN-assigned                 ENUMERATED{true}       OPTIONAL,
Hash-based                        ENUMERATED{true}    OPTIONAL,
  ........
}
Segmentation-details     SEQUENCE{
Max-segment-number                       INTEGER(0..X)     OPTIONAL,
}
}
-- TAG-UE-CAPABILITYRAT-REQUESTLIST-STOP
-- ASN1STOP
``` |

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760 but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720 and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730. WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710 and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
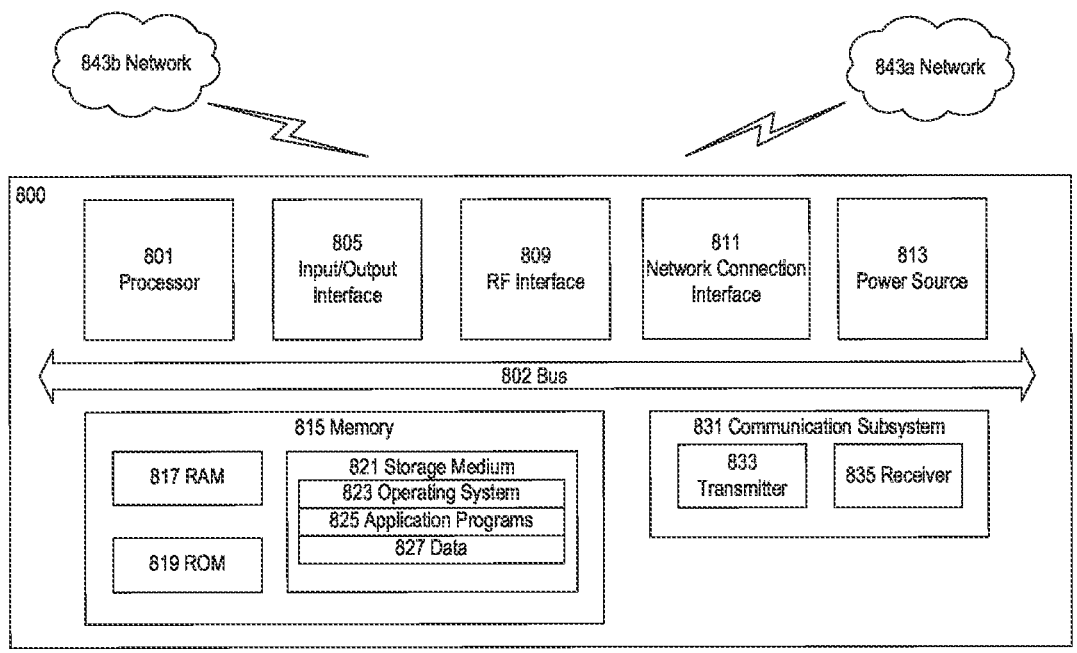
FIG. 8 is a schematic diagram of a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software, or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software, or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software, or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
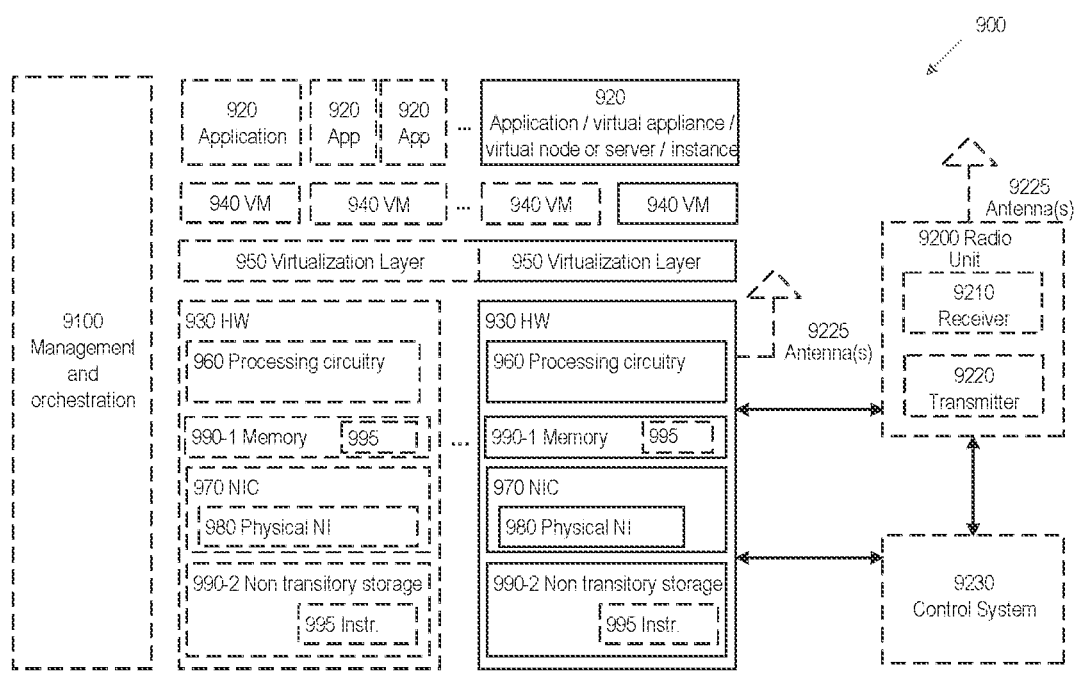
FIG. 9 is a schematic diagram of a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
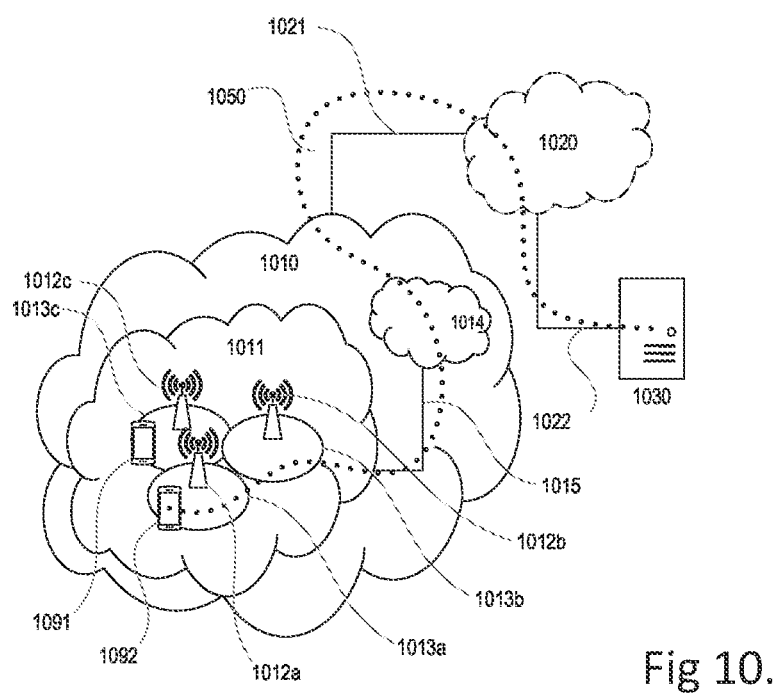
FIG. 10 is a schematic diagram of a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
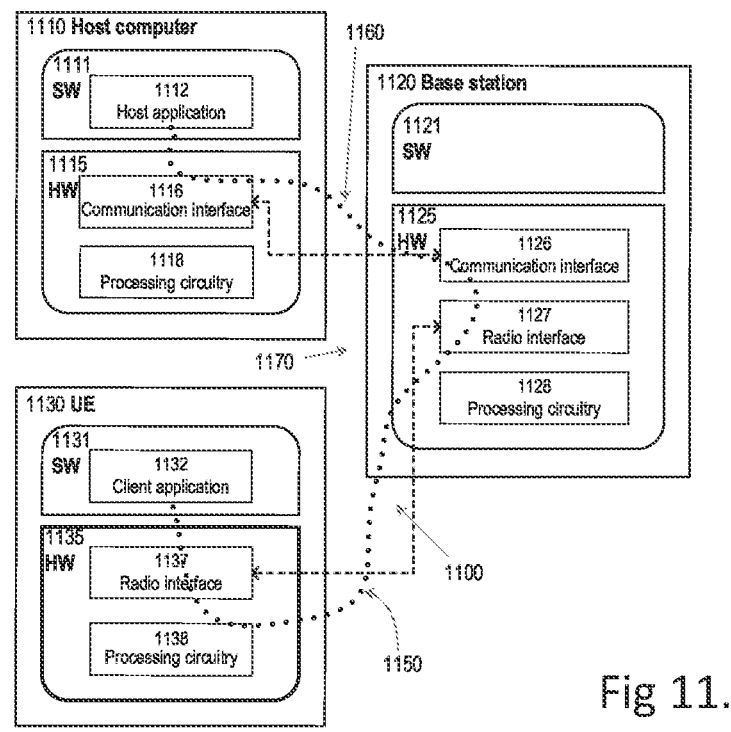
FIG. 11 is a schematic diagram of a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the transmission of information from the wireless device to the network node and thereby provide benefits such as reduced signaling.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 111 and 1131 causes messages to be transmitted, in particular empty or 'dummy' messages, using OTT connection 1150 while it monitors propagation times, errors etc.

Figure 12:
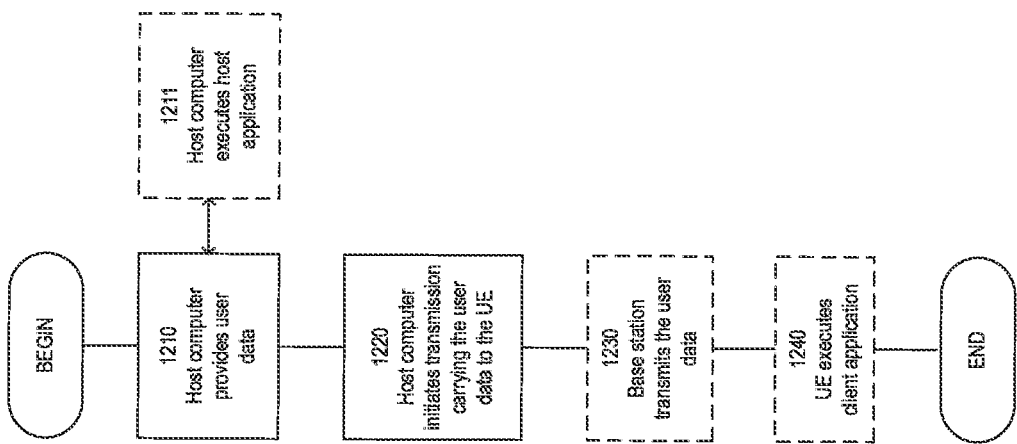
FIG. 12 is a flowchart showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
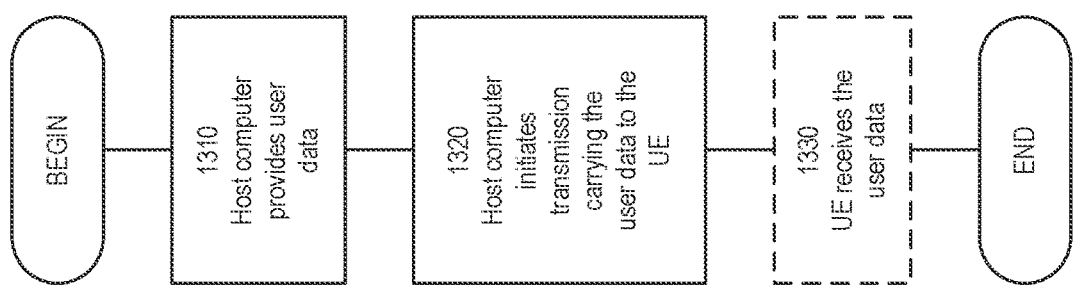
FIG. 13 is a flowchart showing methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
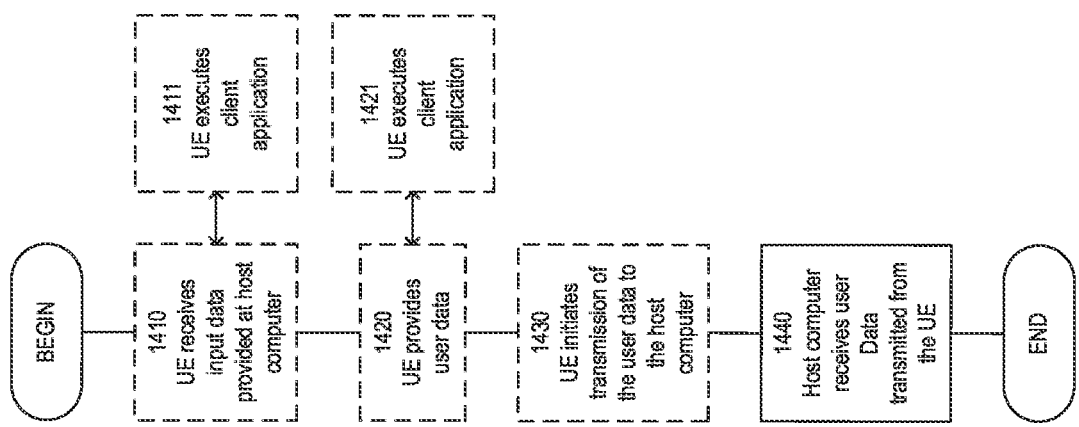
FIG. 14 is a flowchart showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
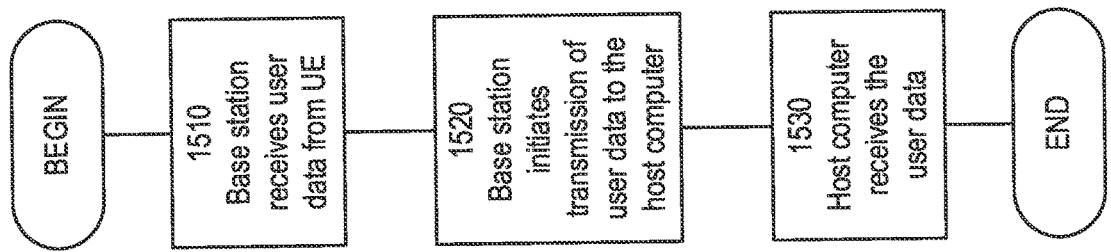
FIG. 15 is a flowchart showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
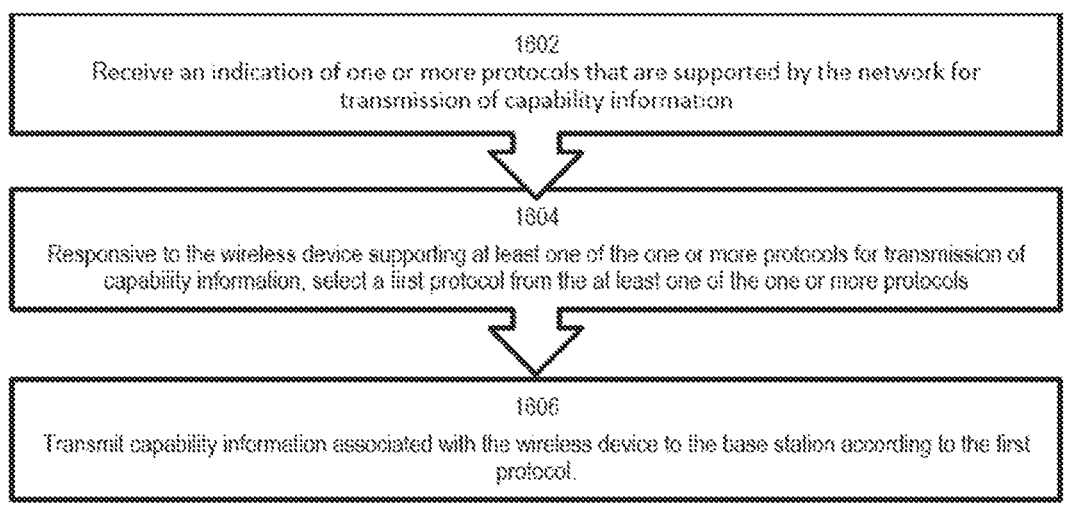
FIG. 16 is a flowchart of a method in accordance with some embodiments.

FIG. 16 depicts a method in accordance with particular embodiments, the method begins at step 1602 with receiving an indication of one or more protocols that are supported by the network for transmission of capability information. In step 1604, the method comprises responsive to the wireless device supporting at least one of the one or more protocols for transmission of capability information, selecting a first protocol from the at least one of the one or more protocols. In step 1606 the method comprises transmitting capability information associated with the wireless device to the base station according to the first protocol. The method may be performed by a wireless device for transmitting capability information to a base station in a network.

Figure 17:
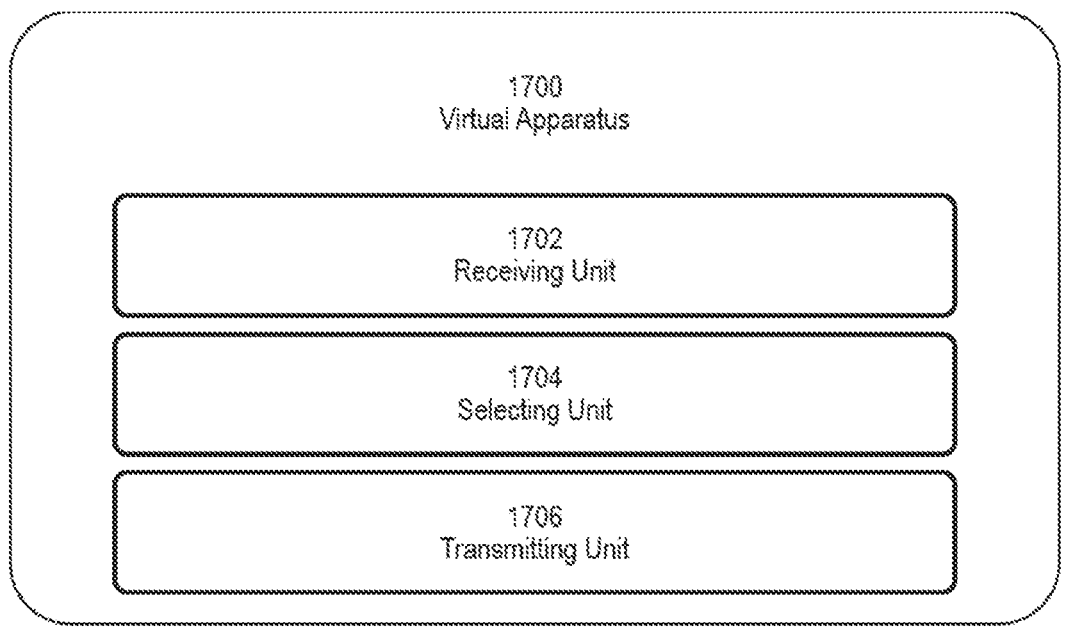
FIG. 17 is a schematic diagram of a virtualization apparatus in accordance with some embodiments.

FIG. 17 illustrates a schematic block diagram of an apparatus 1700 in a wireless network (for example, the wireless network shown in FIG. 7). The apparatus may be implemented in a wireless device or network node (e.g., wireless device 710 or network node 760 shown in FIG. 7). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the Receiving unit 1702, Selecting unit 1704, and Transmitting unit 1706 and any other suitable units of apparatus 1700 to perform corresponding functions according one or more embodiments of the present disclosure.

As illustrated in FIG. 17, apparatus 1700 includes Receiving unit 1702, Selecting unit 1704, and Transmitting Unit 1706. Receiving unit 1702 is configured to receive an indication of one or more protocols that are supported by the network for transmission of capability information. Selecting Unit 1704 is configured to responsive to the wireless device supporting at least one of the one or more protocols for transmission of capability information, select a first protocol from the at least one of the one or more protocols. Transmitting Unit 1706 is configured to transmit capability information associated with the wireless device to the base station according to the first protocol.

Figure 18:
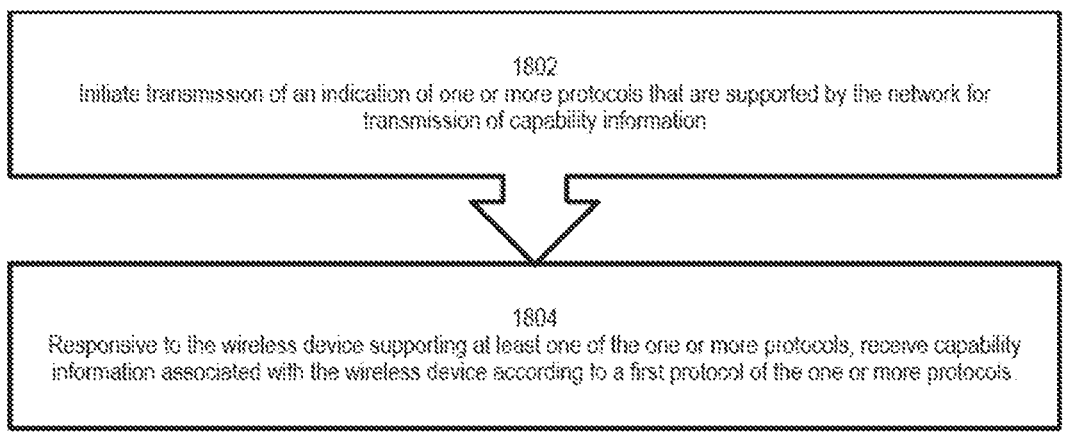
FIG. 18 is a flowchart of a further method in accordance with some embodiments.

FIG. 18 depicts a method in accordance with particular embodiments, the method begins at step 1802 with initiating transmission of an indication of one or more protocols that are supported by the network for transmission of capability information. In step 1804, the method comprises responsive to the wireless device supporting at least one of the one or more protocols, receiving capability information associated with the wireless device according to a first protocol of the one or more protocols. The method may be performed by a base station or may be performed by another node in the network.

Figure 19:
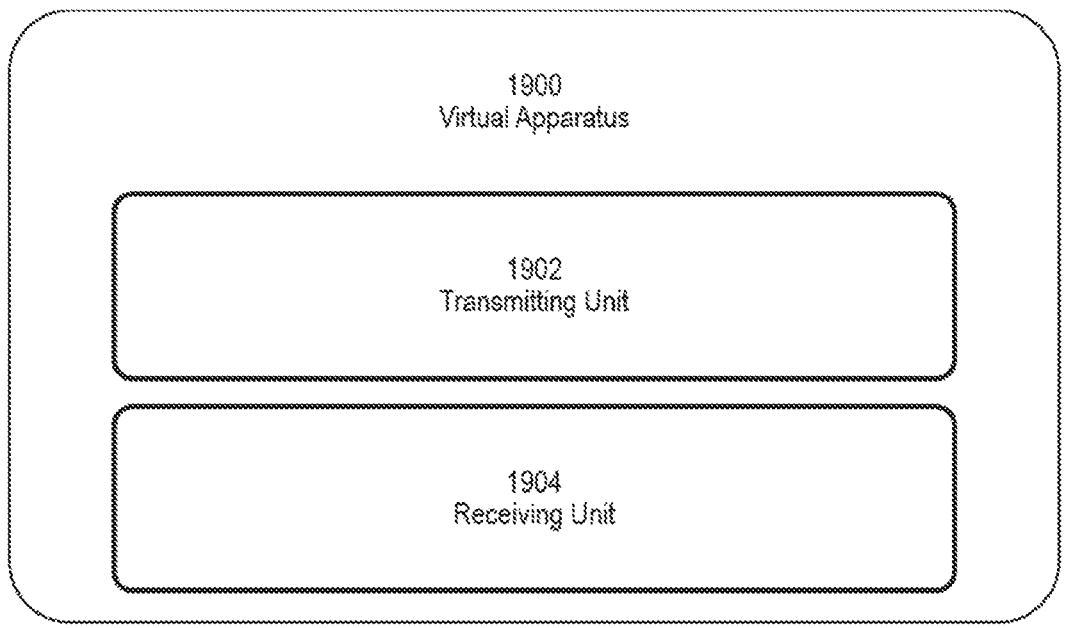
FIG. 19 is a schematic diagram of a further virtualization apparatus in accordance with some embodiments.

FIG. 19 illustrates a schematic block diagram of an apparatus 1900 in a wireless network (for example, the wireless network shown in FIG. 7). The apparatus may be implemented in a wireless device or network node (e.g., wireless device 710 or network node 760 shown in FIG. 7). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the Transmitting unit 1902 and Receiving unit 1904 and any other suitable units of apparatus 1900 to perform corresponding functions according one or more embodiments of the present disclosure.

As illustrated in FIG. 19, apparatus 1900 includes Transmitting unit 1902 and Receiving unit 1904. Transmitting unit 1902 is configured to initiate transmission of an indication of one or more protocols that are supported by the network for transmission of capability information. Receiving Unit 1904 is configured to responsive to the wireless device supporting at least one of the one or more protocols, receiving capability information associated with the wireless device according to a first protocol of the one or more protocols.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered statements provide additional information on certain aspects of embodiments:

1. A method performed by a wireless device for transmitting capability information to a base station in a network, the method comprising:
   receiving an indication of one or more protocols that are supported by the network for transmission of capability information;
   responsive to the wireless device supporting at least one of the one or more protocols for transmission of capability information,
   selecting a first protocol from the at least one of the one or more protocols, and
   transmitting capability information associated with the wireless device to the base station according to the first protocol.
2. The method of statement 1 wherein.
   the indication identifies a priority associated with each of the one or more protocols, and
   the step of selecting comprises selecting the first protocol by selecting a protocol associated with a highest priority from the at least one of the one or more protocols supported by the wireless device.
3. The method of statement 2 wherein,
   the indication identifies a priority associated with each of the one or more protocols by listing the one or more protocols in order of priority.
4. The method of statement 2 wherein,
   the indication identifies a priority associated with each of the one or more protocols by associating each of the one or more protocols with an explicit priority value.
5. The method of any preceding statement wherein,
   responsive to the wireless device not supporting at least one of the one or more protocols, selecting a legacy protocol for transmission of capability information, and transmitting the capability information associated with the wireless device to the base station according to the legacy protocol.
6. The method of any preceding statement wherein the step of transmitting the capability information associated with the wireless device to the base station according to the first protocol further comprises transmitting the capability information with an indication of the first protocol.
7. The method of any preceding statement wherein the indication identifies a filter associated with each of the one or more protocols respectively, wherein the filter indicates which capability information the wireless device should transmit according to the associated protocol.
8. The method of statement 7 wherein the capability information associated with the wireless device comprises capability information indicated by a first filter associated with the first protocol.
9. The method of any statement embodiment, wherein the one or more protocols comprises one or more of: a protocol utilizing compression, a protocol utilizing segmentation, and a combination protocol utilizing both compression and segmentation.
10. The method of any preceding statement wherein the indication of the one or more protocols is received from the base station as part of a request for capability information.
11. The method of any preceding statement wherein the indication identifies a size indication associated with each of the one or more protocols respectively, wherein the size indicator indicates one of: a maximum size of a message to be transmitted by the wireless device comprising the capability information, or a number of messages to be transmitted by the wireless device to transmit the capability information.
12. The method of any previous statement wherein the one or more protocols comprises a protocol utilizing compression, and wherein the indication identifies a respective preference associated with each of a plurality of configuration options available for the protocol utilizing compression.
13. The method of any of the previous statements, further comprising:
   providing user data; and
   forwarding the user data to a host computer via the transmission to the base station.
14. A method performed by a network node for controlling the receipt of capability information from a wireless device at a base station, the method comprising:
   initiating transmission of an indication of one or more protocols that are supported by the network for transmission of capability information;
   responsive to the wireless device supporting at least one of the one or more protocols, receiving capability information associated with the wireless device according to a first protocol of the one or more protocols.
15. The method of statement 14 wherein,
   the indication identifies a priority associated with each of the one or more protocols.

16. The method of statement 15 wherein,
the indication identifies a priority associated with each of the one or more protocols by listing the one or more protocols in order of priority.

17. The method of statement 14 wherein,
the indication identifies a priority associated with each of the one or more protocols by associating each of the one or more protocols with an explicit priority value.

18. The method of any one of statements 14 to 17 wherein,
responsive to the wireless device not supporting at least one of the one or more protocols, receiving the capability information associated with the wireless device according to a legacy protocol.

19. The method of any one of statements 14 to 17 wherein the step of receiving the capability information associated with the wireless device further comprises receiving the capability information with an indication of the first protocol.

20. The method of any one of statements 14 to 19 wherein the indication identifies a filter associated with each of the one or more protocols respectively, wherein the filter indicates which capability information the wireless device should transmit according to the associated protocol.

21. The method of statement 20 wherein the capability information associated with the wireless device comprises capability information indicated by a first filter associated with the first protocol.

22. The method of any one of statements 14 to 21 wherein the one or more protocols comprises one or more of: a protocol utilizing compression, a protocol utilizing segmentation, and a combination protocol utilizing both compression and segmentation.

23. The method of any one of statements 14 to 22 wherein the indication of the one or more protocols is transmitted as part of a request for capability information from the wireless device.

24. The method of any one of statements 14 to 23 wherein the indication identifies a size indication associated with one of the one or more protocols respectively, wherein the size indicator indicates one of: a maximum size of a message to be transmitted by the wireless device comprising the capability information, or a number of messages to be transmitted by the wireless device to transmit the capability information.

25. The method of any one of statements 14 to 24 wherein the one or more protocols comprises a protocol utilizing compression, and wherein the indication identified a preference associated with a plurality of configuration options available for the protocol utilizing compression.

26. The method of any of the previous statements, further comprising:
obtaining user data; and
forwarding the user data to a host computer or a wireless device.

27. A wireless device for transmitting capability information to a base station, the wireless device comprising:
processing circuitry configured to perform any of the steps of any of statements 1 to 13; and
power supply circuitry configured to supply power to the wireless device.

28. A base station for receiving capability information from a wireless device, the base station comprising:
processing circuitry configured to perform any of the steps of any of statements 14 to 26;
power supply circuitry configured to supply power to the base station.

29. A user equipment (UE) for transmitting capability information to a base station, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of statements 1 to 13;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

30. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of statements 14 to 26.

31. The communication system of statement 30 further including the base station.

32. The communication system of any of statements 30 and 31, further including the UE, wherein the UE is configured to communicate with the base station.

33. The communication system of any of statements 30 to 32, wherein:
the processing circuitry of the host computer is configured to execute a host application, thereby providing the user data; and
the UE comprises processing circuitry configured to execute a client application associated with the host application.

34. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of statements 14 to 26.

35. The method of statement 34, further comprising, at the base station, transmitting the user data.

36. The method of any of statements 34 and 35, wherein the user data is provided at the host computer by executing a host application, the method further comprising, at the UE, executing a client application associated with the host application.

37. A user equipment (UE) configured to communicate with a base station, the UE comprising a radio interface and processing circuitry configured to perform any of the steps of any of statements 34 to 36.

38. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps of any of statements 1 to 13.

39. The communication system of statement 38, wherein the cellular network further includes a base station configured to communicate with the UE.

40. The communication system of any of statements 38 and 39, wherein:
   the processing circuitry of the host computer is configured to execute a host application, thereby providing the user data; and
   the UE's processing circuitry is configured to execute a client application associated with the host application.

41. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of statements 1 to 13.

42. The method of statement 41, further comprising at the UE, receiving the user data from the base station.

43. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of statements 1 to 13.

44. The communication system of statement 43, further including the UE.

45. The communication system of any of statements 43 and 44, further including the base station, wherein the base station comprises a radio interface configured to communicate with the UE and a communication interface configured to forward to the host computer the user data carried by a transmission from the UE to the base station.

46. The communication system of any of statements 43 to 45, wherein:
   the processing circuitry of the host computer is configured to execute a host application; and
   the UE's processing circuitry is configured to execute a client application associated with the host application, thereby providing the user data.

47. The communication system of any of statements 43 to 46, wherein:
   the processing circuitry of the host computer is configured to execute a host application, thereby providing request data; and
   the UE's processing circuitry is configured to execute a client application associated with the host application, thereby providing the user data in response to the request data.

48. A method implemented in a communication system including a host computer, a base station and a user equipment (UE), the method comprising:
   at the host computer, receiving user data transmitted to the base station from the UE, wherein the UE performs any of the steps of any of statements 1 to 13.

49. The method of statement 48, further comprising, at the UE, providing the user data to the base station.

50. The method of any of statements 48 and 49, further comprising:
   at the UE, executing a client application, thereby providing the user data to be transmitted; and
   at the host computer, executing a host application associated with the client application.

51. The method of any of statements 48 to 50, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

52. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of statements 14 to 26.

53. The communication system of statement 52 further including the base station.

54. The communication system of any of statements 52 and 53, further including the UE, wherein the UE is configured to communicate with the base station.

55. The communication system of any of statements 52 to 54, wherein:
   the processing circuitry of the host computer is configured to execute a host application;
   the UE is configured to execute a client application associated with the host application, thereby providing the user data to be received by the host computer.

56. A method implemented in a communication system including a host computer, a base station and a user equipment (UE), the method comprising:
   at the host computer, receiving, from the base station, user data originating from a transmission which the base station has received from the UE, wherein the UE performs any of the steps of any of statements 1 to 13.

57. The method of statement 56, further comprising at the base station, receiving the user data from the UE.

58. The method of any of statements 56 and 57, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |

-continued

| | |
|---|---|
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |

-continued

| | |
|---|---|
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

What is claimed is:

1. A method performed by a wireless device for transmitting capability information to a base station in a communications network, the method comprising:

receiving, from the base station as part of a request for capability information, an indication that segmentation of Radio Resource Control (RRC) messages is supported by the communications network for transmission of capability information; and transmitting capability information associated with the wireless device to the base station in segments, thereby making it possible for the wireless device to transmit more capability information than one Packet Data Convergence Protocol (PDCP) data unit can contain, and wherein each segment has a maximum size corresponding to the maximum size of one PDCP data unit.

2. The method of claim 1, wherein the request for capability information identifies a filter, wherein the filter indicates which capability information the wireless device is to transmit.

3. The method of claim 1, wherein the indication received from the base station as part of a request for capability information identifies a size indication, indicating one of: a maximum size of a message to be transmitted by the wireless device comprising the capability information, or a maximum number of messages to be transmitted by the wireless device to transmit the capability information.

4. The method of claim 1, further comprising:

providing user data; and forwarding the user data to a host computer via the transmission to the base station.

5. A wireless device comprising:
a radio interface; and
processing circuitry configured to:
receive, via the radio interface, a request for capability information transmitted from a base station in a communications network, the request indicating that the communications network supports segmentation of Radio Resource Control (RRC) messages for transmission of capability information;
transmit, via the radio interface, capability information associated with the wireless device to the base station in segments, thereby making it possible to transmit more capability information than one Packet Data Convergence Protocol (PDCP) data unit can contain, each segment having a maximum size corresponding to the maximum size of one PDCP data unit.

6. The wireless device of claim 5, wherein the request for capability information identifies a filter that indicates which capability information the wireless device is to transmit, and wherein the processing circuitry is configured to apply the filter.

7. The wireless device of claim 5, wherein the indication received from the base station as part of a request for capability information identifies a size indication, wherein the size indicator indicates one of: a maximum size of a message to be transmitted by the wireless device comprising the capability information, or a maximum number of messages to be transmitted by the wireless device to transmit the capability information.

8. The wireless device of claim 5, wherein the processing circuitry is further configured to forward user data to a host computer via transmission of the user data to the base station.

9. A method of operation by a base station in a communications network, the method comprising:

transmitting a request for capability information to a wireless device, the request indicating that the communications network supports segmentation of Radio Resource Control (RRC) messages for transmission of capability information; and receiving capability information from the wireless device in segments, thereby making it possible for the wireless device to transmit more capability information than one Packet Data Convergence Protocol (PDCP) data unit can contain, and wherein each segment has a maximum size corresponding to the maximum size of one PDCP data unit.

10. The method of claim 9, wherein the request for capability information identifies a filter, wherein the filter indicates which capability information the wireless device is to transmit.

11. The method of claim 9, wherein the request for capability information includes a size indication, indicating one of: a maximum size of a message to be transmitted by the wireless device comprising the capability information, or a maximum number of messages to be transmitted by the wireless device to transmit the capability information.

12. The method of claim 9, further comprising:

receiving user data from the wireless device; and forwarding the user data towards a host computer.

13. A base station configured for operation in a communications network, the base station comprising:

a radio interface; and processing circuitry configured to:

transmit, via the radio interface, a request for capability information to a wireless device, the request indicating that the communications network supports segmentation of Radio Resource Control (RRC) messages for transmission of capability information; and receive, via the radio interface, capability information from the wireless device in segments, thereby making it possible for the wireless device to transmit more capability information than one Packet Data Convergence Protocol (PDCP) data unit can contain, and wherein each segment has a maximum size corresponding to the maximum size of one PDCP data unit.

14. The base station of claim 13, wherein the request for capability information identifies a filter, wherein the filter indicates which capability information the wireless device is to transmit.

15. The base station of claim 13, wherein the request for capability information includes a size indication, indicating one of: a maximum size of a message to be transmitted by the wireless device comprising the capability information, or a maximum number of messages to be transmitted by the wireless device to transmit the capability information.

16. The base station of claim 13, wherein the processing circuitry is further configured to:

receive, via the radio interface, user data from the wireless device; and forward, via a network interface of the base station, the user data towards a host computer.

* * * * *